(12) United States Patent
Bigman et al.

(10) Patent No.: US 9,665,630 B1
(45) Date of Patent: May 30, 2017

(54) TECHNIQUES FOR PROVIDING STORAGE HINTS FOR USE IN CONNECTION WITH DATA MOVEMENT OPTIMIZATIONS

(75) Inventors: Ron Bigman, Holon (IL); Adi Hirschtein, Givataim (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/525,816

(22) Filed: Jun. 18, 2012

(51) Int. Cl.
*G06F 17/30* (2006.01)

(52) U.S. Cl.
CPC ................ *G06F 17/3053* (2013.01)

(58) Field of Classification Search
CPC ............ G06F 17/30221; G06F 17/3053
USPC .................... 707/748, 999.2, 736
See application file for complete search history.

(56) References Cited

U.S. PATENT DOCUMENTS

| | | | |
|---|---|---|---|
| 6,324,620 B1* | 11/2001 | Christenson et al. | 711/112 |
| 6,502,125 B1* | 12/2002 | Kenner | G06F 17/30781 348/E5.008 |
| 6,519,660 B1* | 2/2003 | Rooney | G06F 9/5077 709/220 |
| 6,687,765 B2* | 2/2004 | Surugucchi | G06F 3/0605 710/15 |
| 6,950,888 B1* | 9/2005 | Rooney | G06F 11/3419 710/16 |
| 6,981,040 B1* | 12/2005 | Konig et al. | 709/224 |
| 7,027,051 B2* | 4/2006 | Alford, Jr. | G06T 17/00 345/440 |
| 7,216,149 B1* | 5/2007 | Briscoe et al. | 709/217 |
| 7,379,994 B2* | 5/2008 | Collazo | 709/224 |
| 7,430,638 B2* | 9/2008 | Kellar | G06F 12/0862 707/999.101 |
| 7,467,143 B2* | 12/2008 | Nojima | G06F 3/0605 |
| 7,539,709 B1* | 5/2009 | Vengerov et al. | |
| 7,596,587 B2* | 9/2009 | Berkhin | G06F 17/30221 |
| 7,949,637 B1 | 5/2011 | Burke | |
| 8,224,813 B2* | 7/2012 | Kaluskar | G06F 12/0866 707/719 |
| 8,255,660 B1* | 8/2012 | Chatterjee et al. | 711/170 |

(Continued)

OTHER PUBLICATIONS

EMC Corporation, White Paper, "Leveraging EMC Enterprise Flash Drives for SAP Environments with Zettapoint", Oct. 2009.

(Continued)

*Primary Examiner* — Miranda Le
(74) *Attorney, Agent, or Firm* — Muirhead and Saturnelli, LLC

(57) ABSTRACT

Described are techniques for providing hints. Activity data for data portions is received. For each data portion, activity data is aggregated for each of a plurality of time periods and a value for a metric is determined for the data portion in accordance with the aggregated activity data. The values for the metric are ranked. A set of one or more data portions are identified based on the ranked metric values. Hint generation processing is performed to generate a hint for each data portion in said set. The hint may be used in connection with performing data storage movement optimizations to move selected data portions between different storage tiers having different performance classifications. The metric may be determined using one or more criteria including standard deviation, entropy and/or a maximum probability for a time period having the largest portion of I/O wait time for a data portion.

17 Claims, 7 Drawing Sheets

(56) References Cited

U.S. PATENT DOCUMENTS

| | | | | |
|---|---|---|---|---|
| 8,321,646 | B2* | 11/2012 | Davies | 711/165 |
| 8,335,776 | B2* | 12/2012 | Gokhale | 707/696 |
| 8,352,429 | B1* | 1/2013 | Mamidi | G06F 17/30339 |
| | | | | 707/640 |
| 8,429,096 | B1* | 4/2013 | Soundararajan | G06F 17/30306 |
| | | | | 706/12 |
| 8,429,346 | B1* | 4/2013 | Chen et al. | 711/114 |
| 8,442,067 | B2* | 5/2013 | Bryan et al. | 370/458 |
| 8,458,530 | B2* | 6/2013 | Kini | G06F 11/3466 |
| | | | | 714/25 |
| 8,527,467 | B2* | 9/2013 | Shmueli | G06F 17/30153 |
| | | | | 707/651 |
| 8,578,096 | B2* | 11/2013 | Malige et al. | 711/117 |
| 8,578,108 | B2* | 11/2013 | Jennas et al. | 711/162 |
| 8,583,838 | B1* | 11/2013 | Marshak et al. | 710/18 |
| 8,706,962 | B2* | 4/2014 | Belluomini et al. | 711/117 |
| 8,732,217 | B2* | 5/2014 | Mamidi et al. | 707/821 |
| 8,751,463 | B1* | 6/2014 | Chamness | 707/693 |
| 2006/0117319 | A1* | 6/2006 | Ayres | G06F 9/5044 |
| | | | | 718/104 |
| 2007/0050684 | A1* | 3/2007 | Takaoka | G06F 3/061 |
| | | | | 714/47.2 |
| 2007/0233868 | A1* | 10/2007 | Tyrrell et al. | 709/226 |
| 2008/0263259 | A1* | 10/2008 | Sadovsky | G06F 3/0613 |
| | | | | 711/100 |
| 2009/0024549 | A1* | 1/2009 | Johnson | 706/46 |
| 2009/0070541 | A1* | 3/2009 | Yochai | 711/165 |
| 2009/0089410 | A1* | 4/2009 | Vicente | 709/223 |
| 2009/0172666 | A1* | 7/2009 | Yahalom et al. | 718/1 |
| 2009/0327376 | A1* | 12/2009 | Nath | G06F 3/0616 |
| 2010/0191922 | A1* | 7/2010 | Dickey et al. | 711/154 |
| 2011/0010514 | A1* | 1/2011 | Benhase et al. | 711/162 |
| 2011/0035366 | A1* | 2/2011 | Warshawsky | G06F 17/30368 |
| | | | | 707/705 |
| 2011/0144969 | A1* | 6/2011 | Dayka | G06G 7/12 |
| | | | | 703/17 |
| 2011/0185120 | A1* | 7/2011 | Jess | 711/114 |
| 2011/0197046 | A1* | 8/2011 | Chiu et al. | 711/171 |
| 2011/0246837 | A1* | 10/2011 | Kato | 714/47.1 |
| 2012/0072656 | A1* | 3/2012 | Archak et al. | 711/104 |
| 2012/0151141 | A1* | 6/2012 | Bell et al. | 711/118 |
| 2012/0185648 | A1* | 7/2012 | Benhase et al. | 711/118 |
| 2012/0317338 | A1* | 12/2012 | Yi et al. | 711/103 |
| 2013/0290598 | A1* | 10/2013 | Fiske et al. | 711/103 |
| 2013/0297872 | A1* | 11/2013 | Hyde et al. | 711/117 |

OTHER PUBLICATIONS

"Standard deviation", http://en.wikipedia.org/wiki/Standard_deviation, May 22, 2012.

EMC Corporation, White Paper, "EMC Fast VP for Unified Storage Systems", Oct. 2011.

"Entropy (information theory)", http://en.wikipedia.org/wiki/Entropy_information_theory), May 22, 2012.

* cited by examiner

| 402 Location (e.g., device, offset) | 404 Time period(s) (e.g., hours of day, day of week) | 406 Activity level (e.g., LOW, HIGH, workload or activity metric value(s) associated with time period(s)) |
| --- | --- | --- |

FIG. 7

TECHNIQUES FOR PROVIDING STORAGE HINTS FOR USE IN CONNECTION WITH DATA MOVEMENT OPTIMIZATIONS

BACKGROUND

Technical Field

This application generally relates to data storage, and more particularly to techniques used in connection with providing data storage hints.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method for providing hints comprising: receiving activity data for a plurality of data portions; performing first processing for each of the plurality of data portions, said first processing including: aggregating activity data for each data portion for each of a plurality of time periods; and determining a value for a metric for each data portion in accordance with the step of aggregating; ranking a plurality of values for the metric determined by the first processing for the plurality of data portions; identifying a set of one or more data portions based on the ranking; and performing hint generation processing to generate a hint for each data portion in the set. The hint is used in connection with performing data storage movement optimizations to move selected ones of the plurality of data portions between different storage tiers having different performance classifications. The step of identifying ma include selecting one of the plurality of data portions having a first value for the metric that is a largest of the plurality of values; and performing hint generation processing for the one data portion. The hint for said each data portion in the set may include a location of said each data portion, may identify one or more of the plurality of time periods, and may identify a level of activity for said each data portion during the identified one or more time periods of the hint based on the activity data. The level of activity may denote a level of activity below a threshold and the hint may be used in connection with evaluating whether to demote said each data portion in connection with the data storage movement optimization thereby moving said each data portion from a first of the storage tiers to a second of the storage tiers, where the first storage tier has a performance classification higher than the second storage tier. The level of activity may denote a level of activity above a threshold and the hint may be used in connection with evaluating whether to promote said each data portion in connection with the data storage movement optimization thereby moving said each data portion from a first of the storage tiers to a second of the storage tiers, where the second storage tier has a performance classification higher than the first storage tier. The value for the metric may be determined using one or more criteria including any of standard deviation or a probability for one of said plurality of time periods representing an amount of I/O wait time occurring within said one time period with respect to a total amount of I/O wait time across all time periods, said probability being a largest such probability with respect to said plurality of time periods. The one or more criteria may include entropy. The criteria may include a size denoting an amount of storage, and a value denoting a measure of how active said each data portion is. The plurality of time periods may correspond to hours of a day. The plurality of time periods may correspond to days of any of a week or a month. The plurality of time periods may correspond to months of a year. The activity data may include I/O wait time. The plurality of data portions may be objects of a database. The method may include determining a plurality of ranking values for said plurality of data portions, each of the plurality of ranking values for a corresponding one of the plurality of data portions may be represented as:

intensity$^{(1-entropy)}$ wherein intensity is a value denoting a level of activity for said corresponding one of the plurality of data portion and entropy represents an entropy value for said corresponding one of the plurality of data portions. Each data portion in the set may have one of the plurality of ranking values which is larger than all others of said plurality of ranking values associated with data portions of the plurality not included in the set. The entropy value may be a value that is equal to or greater than zero (0) and wherein if the entropy value is 0 for said each data portion, then activity for said each data portion may occur in a single one of the plurality of time periods. The intensity may be determined based on an intensity calculation which varies with I/O size and gives greater weight to I/O wait time associated with random read operations than I/O wait time associated with sequential read operations.

In accordance with another aspect of the invention is a computer readable medium comprising code stored thereon for providing hints, the computer readable medium comprising code stored thereon for: receiving activity data for a plurality of data portions; performing first processing for each of the plurality of data portions, said first processing including: aggregating activity data for said each data portion for each of a plurality of time periods; and determining a value for a metric for said each data portion in accordance with said aggregating; ranking a plurality of values for the metric determined by said first processing for said plurality of data portions; identifying a set of one or more data portions based on said ranking; and performing hint generation processing to generate a hint for each data portion in said set, said hint being used in connection with performing data storage movement optimizations to move selected ones of said plurality of data portions between different storage tiers having different performance classifications.

In accordance with another aspect of the invention is a system comprising: one or more data storage systems for which data storage movement optimizations are performed by a data storage optimizer; a computer readable medium comprising code stored thereon for: receiving activity data for a plurality of data portions; performing first processing for each of the plurality of data portions, said first processing including: aggregating activity data for said each data portion for each of a plurality of time periods; and determining a value for a metric for said each data portion in accordance with said aggregating; ranking a plurality of values for the metric determined by said first processing for said plurality of data portions; identifying a set of one or more data portions based on said ranking; and performing hint generation processing to generate a hint for each data portion in said set, said hint being used in connection with performing data storage movement optimizations to move selected ones of said plurality of data portions between different storage tiers of said one or more data storage systems, said different storage tiers having different performance classifications. The different storage tiers may include at least a first storage tier of solid state storage drives and a second storage tier of rotating disk drives.

BRIEF DESCRIPTION OF THE DRAWINGS

Features and advantages of the present invention will become more apparent from the following detailed description of exemplary embodiments thereof taken in conjunction with the accompanying drawings in which:

FIG. 5 is an example of activity data that may be collected for use in connection with hint generation using the techniques herein;

FIG. 7 is an example illustrating information that may be included in a hint generated in an embodiment in accordance with techniques herein.

DETAILED DESCRIPTION OF EMBODIMENT(S)

Figure 1:
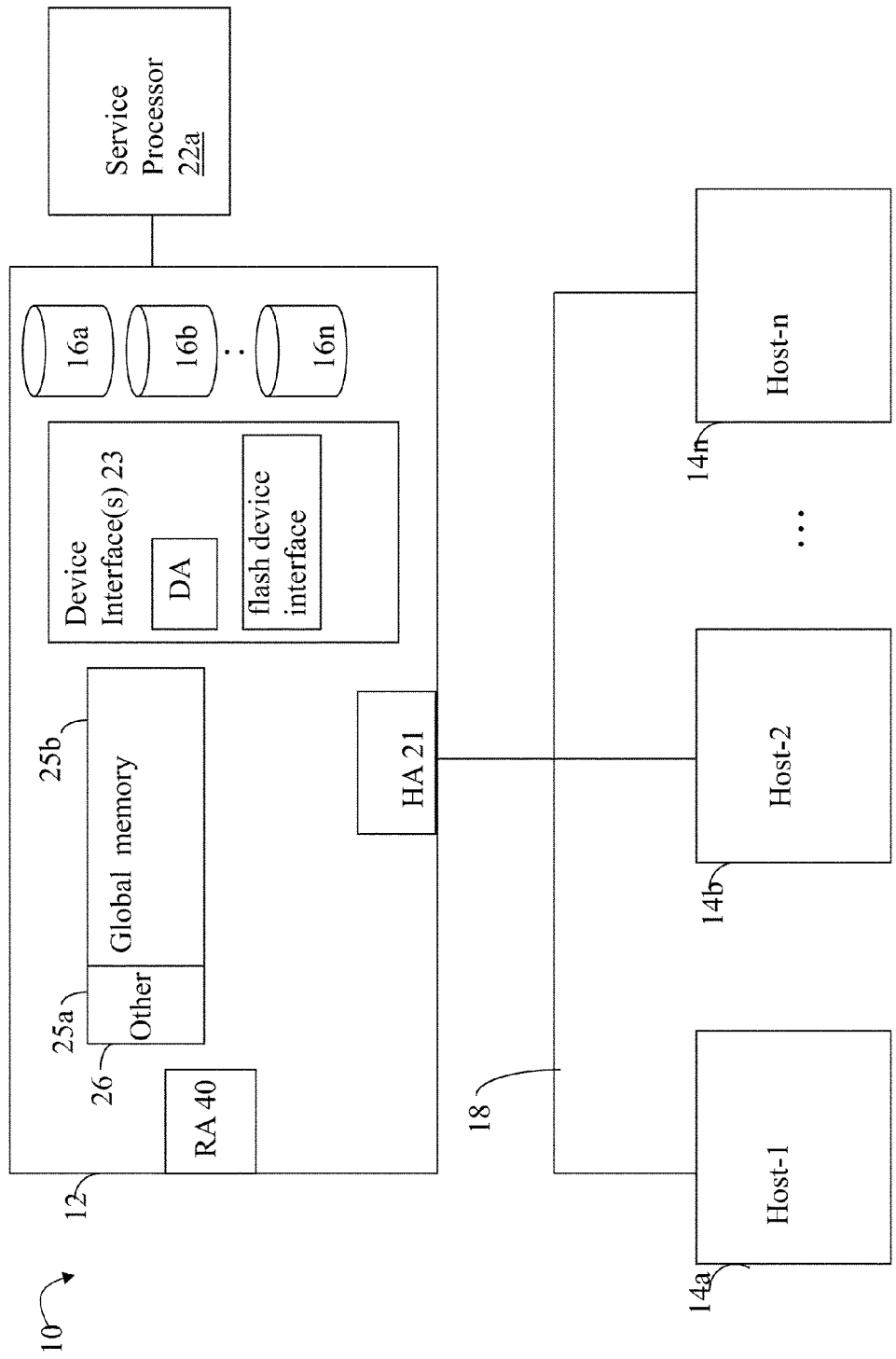
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
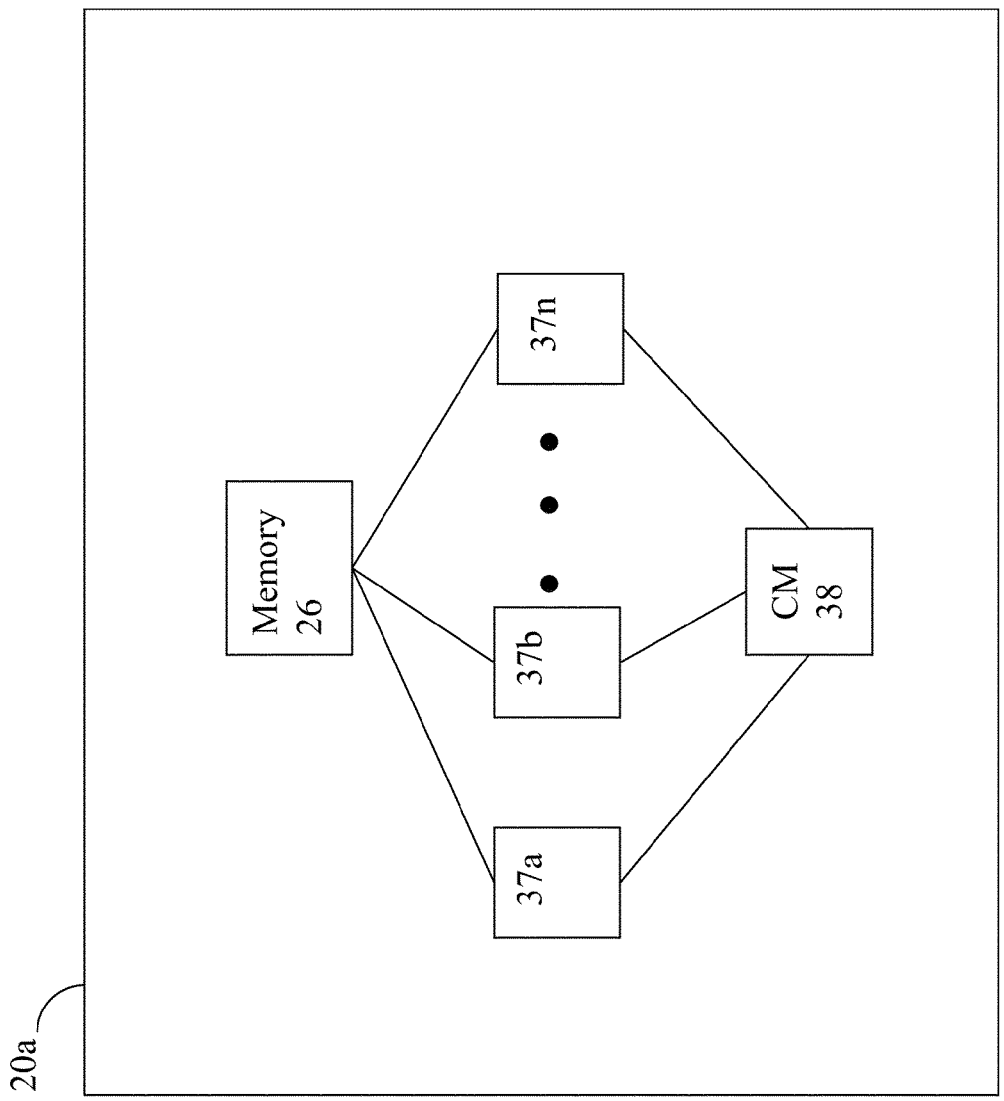
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives (Fibre channel rotating disk drives), and a third tier of all SATA drives (rotating disk drives). The foregoing are some examples of tier definitions and other tier definitions may be specified in accordance with techniques herein. Additionally, each of the two or more storage tiers that may be included in an embodiment may be characterized as having an associated performance classification based on attributes or performance characteristics of the storage tier. For example, in an embodiment including 3 storage tiers as described above, the SSD or flash-based storage tier may be the highest performance storage tier, the FC drive tier may be the second or next highest performance storage tier, and the SATA drive tier may be the lowest performance storage tier relative to the SSD and FC tiers.

Figure 3:
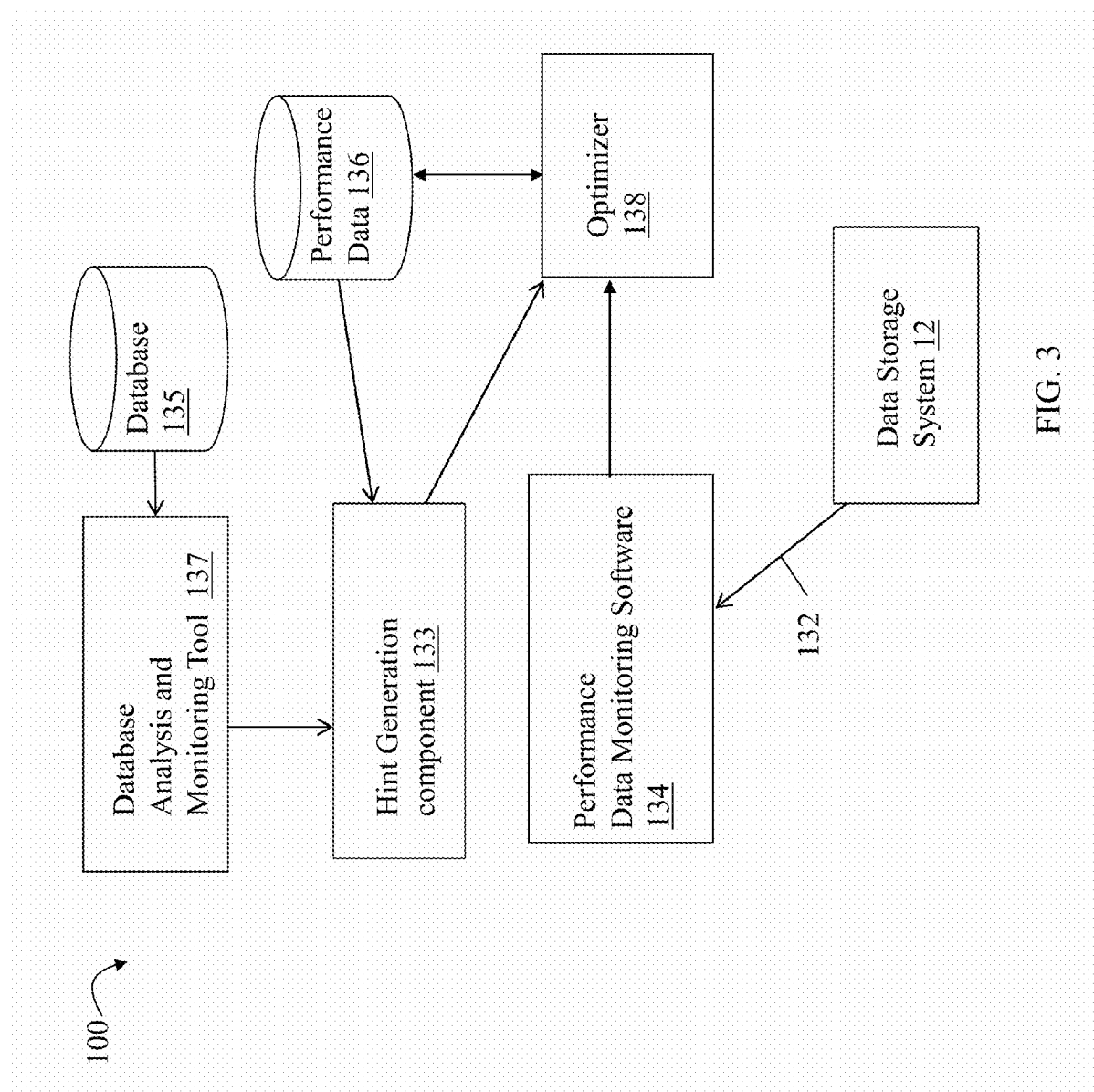
FIG. 3 is an example representing components that may be included in a service processor in an embodiment in accordance with techniques herein.

Referring to FIG. 3, shown is an example 100 of software that may be included in an embodiment in accordance with techniques herein. The example 100 includes performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics described and used in connection with techniques herein. The optimizer may access the performance data, for example, collected for a plurality of LVs when performing a data storage optimization. The performance data 136 may be used in determining a workload for one or more physical devices, logical devices or volumes (LVs) serving as data devices, thin devices or other virtually provisioned devices, portions of thin devices, and the like. The workload may also be a measurement or level of "how busy" a device is, for example, in terms of I/O operations (e.g., I/O throughput such as number of I/Os/second, response time (RT), and the like).

It should be noted that the operations of read and write with respect to an LV, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered and used by the optimizer 138 described herein to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 138 may perform data storage optimization processing such as, for example, how to allocate or partition physical storage in a multi-tiered environment for use by multiple applications. The optimizer 138 may also perform other processing such as, for example, data movement optimization processing to determine what particular portions of devices, such as thin devices, to store on physical devices of a particular tier, evaluate when to move data between physical drives of different tiers, and the like. In connection with techniques described herein, a hint generation component 133 may perform processing to generate hints for one or more selected data portions. As illustrated in FIG. 3, such hints may be provided by the hint generation component 133 to the optimizer 138 for use in connection with data storage optimization processing. Inputs to the hint generation component 133 may include data collected by the database analysis and monitoring tool 137 about the database 135. Hint generation may be based on objects or other data portions of the database 135. In an exemplary embodiment described below, hints may be generated for data portions which are objects although techniques herein may be more generally used in connection with generating hints for data entities or data portions besides objects. Additionally, an embodiment of the hint generation component 133 may optionally utilize performance data 136 in connection with hint generation as may depend on the particular data portions for which hints are generated. For example, the performance data 136 may include activity information related to data portions which are not database objects (e.g., data portions which are rather chunks of a logical device. In this case, the performance data 136 may include information or activity data used in connection with techniques herein).

As described in more detail below, the hint generation component 133 may generate a hint for a data portion based on historical activity data analysis whereby the hint may be used to provide additional information to the optimizer 138 in connection with, for example, performing data movement optimization processing. For example, a hint may be provided identifying one or more time periods of activity based upon an identified pattern for a data portion. The hint may provide information identifying the location of the data portion and whether for the identified time periods the data portion may be a candidate for promotion or demotion to different storage tiers. The optimizer 138 may perform processing for automated evaluation and movement of data including such automated promotion and demotion of data portions between different storage tiers. Data portions may be automatically placed in a storage tier where the optimizer has determined the storage tier is best to service that data in order to improve data storage system performance. The data portions may also be automatically relocated or moved to a different storage tier as the work load and observed performance characteristics for the data portions change over time. Such techniques herein may take into account how "busy" the data portions are (e.g., such as based on one or more workload metrics such as I/O throughput or I/Os per unit of time, response time, utilization, and the like) associated with a storage tier in order to evaluate which data to store on drives of the storage tier. An embodiment of the optimizer 138 in accordance with techniques herein may use such workload information that may characterize a current or recent workload activity for data portions. Additionally, the optimizer 138 may use the hints provided by the hint generation component 133 to identify data portion candidates for data movement optimization processing (e.g., for promotion and/or demotion). Such hints may provide information identifying data portion candidates for data movement optimization processing based on other aspects of analyzed historical data. Thus, hints may provide information in connection with identified patterns of activity for data portions that may be not obtained using data regarding only the more recent or current workload. Based on analyzed historical activity data in accordance with techniques herein, one or more hints may be generated to identify data portions having large variations in their activity level over time and identify an activity level characterizing various high and low points of activity for the data portions.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of FC devices and/or SATA devices may be characterized as a demotion and movement of data from the foregoing second tier to the first tier a promotion. Thresholds may be used in connection with promotion and demotion of data portions in connection with data movement optimizations.

With reference back to FIG. 3, an embodiment of the system described herein may include the Fully Automated Storage Tiering (FAST) product produced by EMC Corporation of Hopkinton, Mass., as the optimizer 138 that provides for the optimization of the use of different storage tiers including the ability to easily create and apply tiering policies (e.g., allocation policies, data movement policies including promotion and demotion of data portions, and the like) to transparently automate the control, placement, and movement of data within a storage system based on business needs. FAST is one example of a data storage optimizer that may utilize the hints provided by the hint generation component 133 described in more detail below.

Figure 4:
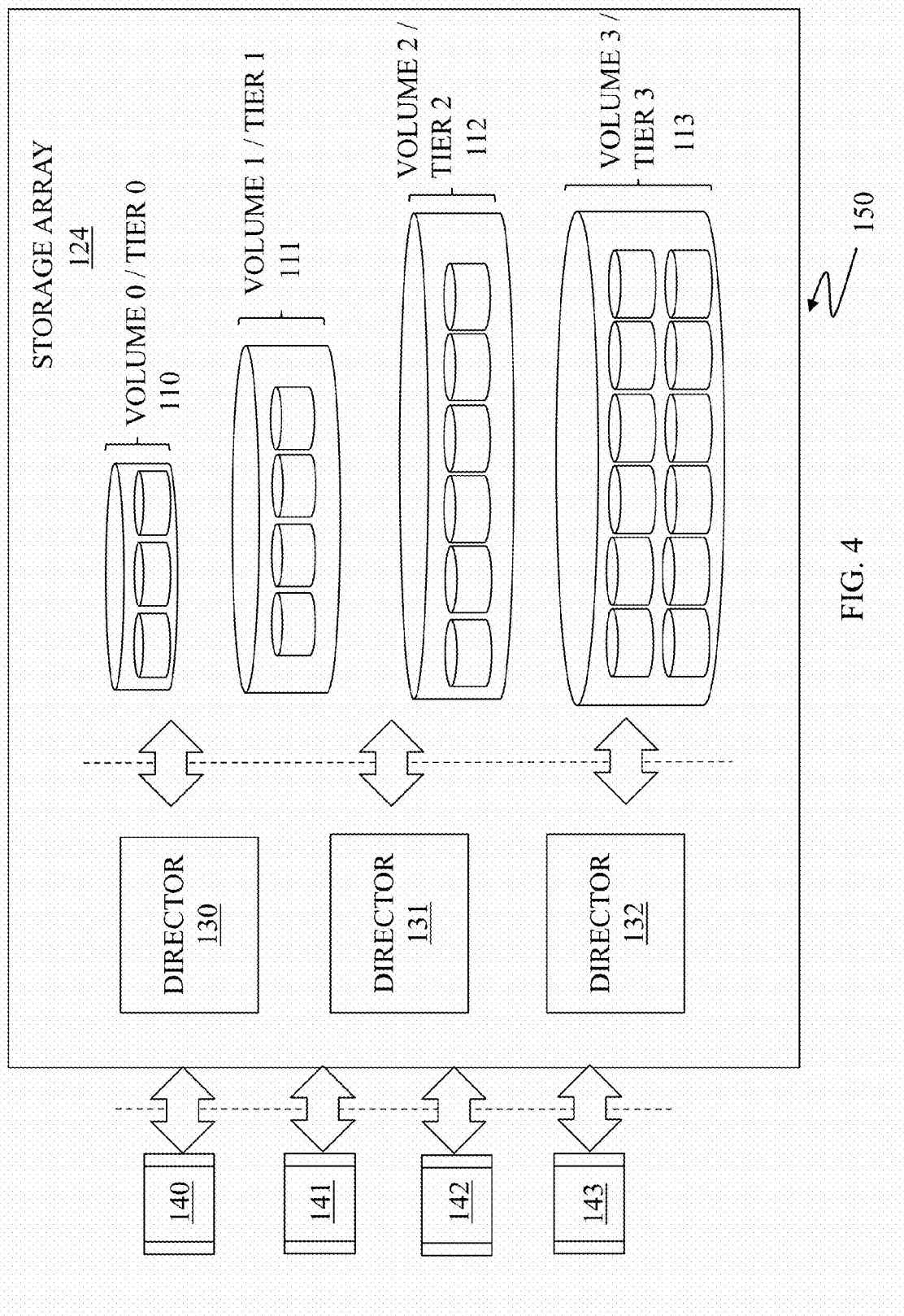
FIG. 4 is an example illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage.

Data portions for which the hint generation component 133 provides hints and/or data portions which are candidates for data movement optimizations may be of any suitable size and granularity and may vary with embodiment. Such data portions may generally be included in any suitable device for which such optimizations are performed. For example, the hint generation component 133 may provide a hint for a particular logical device location. Such location may be associated with any one or more different database entities such as a database object, database table, database record, field(s) of one or more database tables or records, and the like. In one embodiment, data storage movement optimizations may be performed in connection with data portions of thin devices or virtually provisioned (VP) logical devices. A thin or VP device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin or VP devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein. Although an embodiment in accordance with techniques herein may provide for hint generation for use in connection with performing data storage movement optimizations for VP device data portions to relocate the most active data to the highest available performance storage tier and/or relocating the least active data to the lowest or lower performance storage tier(s), an embodiment may more generally use the techniques herein in connection with hint generation and data movement optimizations for data portions of other types of devices such as "thick devices" where the full device storage capacity is allocated and bound to the device.

As described herein, techniques will be described in connection with providing hints to a data storage optimizer performing movement of data between storage tiers with the goal of optimizing data storage system performance (as may be quantified in terms of one or more performance metrics such as response time for processing an I/O). Frequently accessed data thereby having a high workload (such as relative to the data portions) may be relocated to highest performing storage tier such as flash-based storage tier. Data which has the lowest or is least frequently accessed (e.g., lowest amount of workload) may be located in the slower or slowest performance tiers such as SATA or Fibre channel rotating disk drives. Making a determination regarding when such workloads are high enough to be promoted and/or low enough to be demoted may be made using hints generated in accordance with techniques herein alone, or in combination, with, other evaluation information used by the optimizer. The data storage optimizer as described herein may provide for dynamically relocating data between storage tiers as the workload and access to data portions varies over time. For example at a first point in time, a data portion may be frequently accessed having a high workload and stored in a flash-based storage tier. At a later point in time, the same data portion may be relocated to a slower performance tier when its workload greatly decreases. The optimizer performs such evaluation of the different data portions at various points in time, such as using the generated hints described herein based on historical activity data analysis, and then relocates the data portions as needed between storage tiers in connection with performing data storage movement optimizations.

Described in following paragraphs are techniques that may be used to facilitate identification of recurrent data storage access and activity patterns and generate data storage hints such as may be used by the data storage optimizer for data movement optimizations. Such patterns may be associated with a time period such as daily, weekly, monthly, annually, and the like. Such patterns may provide a historical view regarding activity over a defined period of time. Techniques described herein may be contrasted to other techniques which may provide for more short term analysis regarding activity for data portions and perform data movement optimizations, such as to move data between storage tiers, in response to such short term analysis. In accordance with techniques herein, time patterns may be identified which analyze data over a larger period of time providing a more historical perspective regarding activity levels of data portions. In this manner, analysis of activity levels of data portions over a larger time period may be performed to facilitate identification of data portions having a large spike or increase in their activity level and to identify time patterns (e.g., of high and low activity level) for such data portions, and provide appropriate hints regarding the identified time patterns for these data portions. Such hints may be used, for example, by other software such as FAST performing data storage movement optimizations.

In connection with performing such analysis to determine hints, a large amount of historical activity data may be analyzed. What will now be described are techniques that may be used to filter such activity data in connection with providing the hints thereby facilitating identification of data portion candidates having the largest spikes or variation in activity level over a particular time period for when the activity data is analyzed. For such identified data portion candidates, their activity data may be further analyzed to generate one or more hints in accordance with techniques herein.

In following paragraphs, examples are provided for particular metrics that may be used to rank the data portions in connection with identifying one or more candidates for hint generation. Additionally, some examples in following paragraphs provided for illustration refer to identifying data portions which are database oriented, such as identifying objects, and utilize particular activity data, such as I/O wait time. However, as will be appreciated by those skilled in the art, techniques herein are more generally applicable for use with any suitable metric, ranking technique, data portion, and/or activity data.

In some exemplary embodiments as described below, activity information which is gathered and analyzed in connection with hint generation techniques herein may be database-oriented rather than device-oriented. For example, activity information may be obtained in connection with physical and/or logical devices or portions thereof and may thereby be characterized as device-oriented. Although techniques herein may be used in connection with device-oriented activity information, in contrast, an embodiment will be described in which activity information may be obtained in connection with one or more database entities, such as per database object, database table, database record or table row, and the like. Any suitable tool may be used to obtain such database-oriented activity information. For example, DBclassify™ by EMC Corporation is a software tool that monitors and analyzes database I/O performance such as, for example, for an Oracle or SQL database. In some embodiment, the activity information gathered may be per database object. In this manner, activity level information may be obtained for database entities which are database objects rather than just data portions (e.g., device and device location/offset) not associated with any particular database object or other entity having meaning to a user.

In connection with an exemplary embodiment obtaining database-oriented activity data, the data gathered and used in connection with hint generation may be application total I/O wait time. I/O wait time as used in connection with this exemplary activity data may be characterized as an amount of time an application waits or is blocked waiting for an I/O operation to complete. For example, I/O wait time may include the amount of time the application is blocked waiting for requested data, such as a database object, to be read and returned by the data storage system to the application on the host or server. The total elapsed time in connection with a requested operation may be partitioned into processing/CPU time, and total I/O wait time. The total I/O wait time may be further comprised of multiple types of I/O wait times depending on the type of I/O operation. For example, the total I/O wait time may include a first I/O wait time obtained for multi-block read access and may include a second I/O wait time obtained for single block access read operations. The multi-block read access may be also referred to as a sequential read access of multiple data blocks having consecutive logical addresses or locations in terms of database accesses. For example, accessing for read multiple data blocks or objects sequentially located in a database table. A single block I/O is a single read of a single block of data any may also be known as a random read I/O operation. As described in following paragraphs, the total I/O wait time may be used as associated with each database object for some calculations. In connection with other calculations, an embodiment may use the more detailed breakdown of one or more different types of I/O wait times based on the different types of read accesses (e.g., sequential and random) as noted above.

Figure 5:
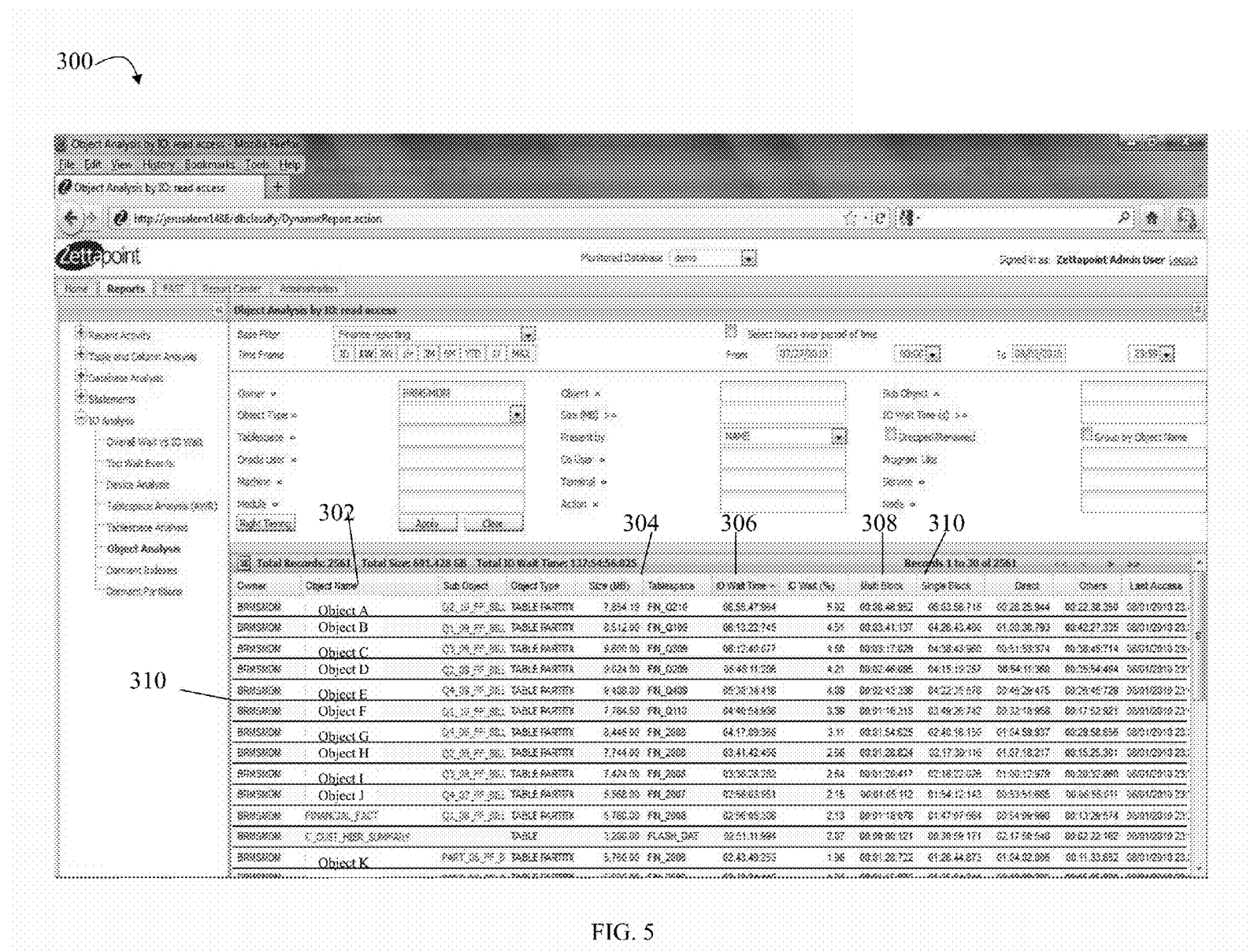

Referring to FIG. 5, shown is an example of a user interface displaying database activity information that may be used in connection with an embodiment in accordance with techniques herein. The example 300 includes a screenshot of data as may be displayed to a user for data obtained using DBClassify™. In the example 300, the display provides the total I/O wait time in column 306 for each object listed in column 302. A row of information in the area 310 is included for each object. The total I/O wait time for an object as listed in a single entry of column 306 may be further comprised of, or partitioned into, multiple types of wait times. For example, column 308 lists sequential read access I/O wait time and column 310 lists random read I/O wait times. Element 304 lists the size of each object.

In connection with techniques herein, the information of column 306 may be used. Furthermore, as will also be described, the information in columns 304, 308 and 310 may also be used in combination with the information from column 306 in an exemplary embodiment described below. In connection with techniques herein, such activity data may be analyzed to identify database objects as candidates for which hints may be generated. The generated hints may provide hint information regarding the expected usage pattern of the candidate object based on this analysis of historical activity data.

Thus, as a first step in connection with hint generation, activity data may be collected such as using the DBClassify™ tool or some other suitable means. For example, activity data for the database objects may be obtained for a collection period or window such as a week, one or more months, one or more years, and the like. As a second step in connection with performing the analysis to identify candidate database objects for hint generation, a desired time pattern is selected where, for example, high and low workload or usage periods may be identified in accordance with this time pattern. For example, such activity data may be analyzed to obtain daily patterns, weekly patterns, monthly patterns, quarterly or yearly patterns, and the like. As an example, consider the case for a daily pattern whereby, for each object, the object's activity data in terms of total I/O wait time may be aggregated based on each hour of the day such as for 24 hours. In this manner, for each object, 24 records of activity data may be obtained, one record for each hour of the day representing the total I/O wait time occurring during each one hour period for the time during which the activity data is analyzed. For example, a first object may have a record representing the total I/O wait time for the time of day from 2-3 p.m. The activity data may be collected for 2 weeks. The total I/O wait time aggregated in the record may be the sum of total I/O wait time for the time period from 2-3 p.m. for the entire two week time period for which the activity data has been collected. In a similar manner, such activity data may be collected for each object for each hourly time period or time slice for the selected daily pattern. In addition to tracking and aggregating the total I/O wait time for each hour for the two week activity collection window, the aggregation may also similarly provide a first sum of the sequential read I/O wait time and a second sum of the random read I/O wait time for the two week activity data collection window.

As a third step in processing for hint generation, a value for one or more selected metrics may be calculated for each object for which aggregation of activity data was performed in the second step. Any suitable metric or statistic may be used which generally facilitates identification of those objects having the largest or greatest variation in activity or workload of all objects under analysis. In one embodiment, a ranking formula may be used to calculate a ranking metric for each object based on the aggregated activity data for the object as follows:

$$\text{ranking} = (\text{intensity})^{1-entropy} \quad \text{EQUATION 1}$$

In EQUATION 1:
"ranking" is the value of the ranking metric;
"intensity" is a value representing the object's intensity providing a measure of how active the object is. (Generally, the more active the object, the higher the object should be ranked based on the increased interest in looking for hints for this objects having the highest activity levels. An equation is provided below for how an embodiment may calculate intensity for an object); and
"entropy" is a value denoting how evenly the activity data is spread across the time periods of aggregated data. (For example, entropy may be a value denoting whether the object has its activity data spread rather evenly across all 24 hours of the day, or whether the object's activity data occurs in a single time period or time slice such as all within a single hour of the day. An equation (e.g., EQUATION 4) is provided below for how an embodiment may calculate entropy for an object generating a value in the range of 0 to 1, inclusively.).

The intensity of an object as used in EQUATION 1 may be determined using the following:

$$\text{Intensity} = \frac{\sum_{j=1}^{X} (\text{io\_ranking} * \text{priority})}{\text{size}} \quad \text{EQUATION 2}$$

where
"intensity" is the resulting value calculated as may be provided as an input in connection with EQUATION 1;
"j" is an index ranging from 1 to X where each "j" represents one of the business processes or applications which access and may wait for the object. (For example, during the collection of activity data, there may be 50 database applications or business processes which issue data operations or requests in connection with an object. In this case, X would be 50).
"io_ranking" represents a scored or weighted I/O wait time value. (In one embodiment, the io_ranking may simply be the total I/O wait time for the "j"th business process or application. In another embodiment, the value for "io_ranking" may be determined using an equation described below);
"priority" may represent the priority associated with each particular "jth" business process or application. (In this manner, different weighted priorities may be given to different business processes for the particular object and may vary with the object. For example, a priority may be associated with each application or business process based on a weighting of importance for that particular application or business process which accesses the object during the time for when activity data is collected); and
"size" represents the size of the object in terms of some unit of storage such as MBs (e.g., see, for example, values in column 304 of FIG. 5).

As mentioned above, "io_ranking" as used in EQUATION 2 may replace the total I/O wait time in the intensity calculation using EQUATION 3 below. In this manner, EQUATION 3 may be used to provide more weight in scoring to random reads thereby increasing the importance of random reads in the overall calculation when considering an object as a candidate for hinting. This may be desired, for example, because an embodiment may perform data prefetching optimizations in connection with detected sequential reads thereby providing a "read ahead mechanism" for sequential read operations. In this manner, using a faster performance tier for storing sequentially read data may not necessarily result in the improvement in system performance as may be obtained in connection with promoting data portions or objects associated with other operation such as random read operations. An embodiment may calculate "io_ranking" as follows:

$$\text{io\_ranking} = \text{sequential I/O wait time} + (\text{random I/O wait time} * \text{RANDOM\_IMPORTANCE\_CONSTANT}) \quad \text{EQUATION 3}$$

where
"sequential I/O wait time" is the component or portion of the total I/O wait time for the particular business process or application "j" based on sequential read I/O operations for the 'jth' business process or application (e.g., portion of the sequential read I/O wait time value as in column 310 of FIG. 5 for the particular "jth" business process or application);

"random I/O wait time" is the component or portion of the total I/O wait time for the particular business process or application "j" based on random or non-sequential read I/O operations for the "jth" business process or application (e.g., porti of the random read I/O wait time as in column 308 of FIG. 5 for the particular "jth" business process or application); and "RANDOM_IMPORTANCE_CONSTANT" may be constant value representing how much of a greater performance gain may be obtained by promoting random read data rather than sequentially read data to the highest perform storage tier. (For example, RANDOM_IMPORTANCE_CONSTANT may represent an increase in performance gained if a data portion of random read data is promoted from FC to EFD rather than promoting a data portion of sequentially read data from FC to EFD. It should be noted that a value for "RANDOM_IMPORTANCE_CONSTANT" may be obtained through experimentation and may vary with embodiment and the particular storage tiers, technologies, and vendors providing such physical drives of the storage tiers in an embodiment).

Entropy as used in EQUATION 1 may be calculated as $$\sum_{i=1}^{N} (p(i) * \log_b(p(i)))$$ EQUATION 4 where

"i" is an index ranging from 1 to N for each of the N aggregated sets of activity data for N time periods based on the selected time pattern. (For example, in the case of daily patterns, N may be 24 for the 24 hour time periods for which activity data is aggregated for each object);

"p(i)" represents the probability that an activity wait will occur in the particular time period or time slice denoted by "i" with respect to the total aggregated wait time for the object across all time slices. (e.g., In the case of 24 hours as the daily 24-hour time pattern, there will be 24 time slices or time periods, one for each of the 24 hours, where p(i) is the ratio of the portion of the aggregated amount of wait time occurring in the particular time slice "i". This may be determined as the total I/O wait time for the "ith" time period with respect to the total aggregated amount of wait time across all 24 time slices/hours. For example, activity data may be collected and hints may be determined based on a daily pattern of activity of 24 hours. There may be 100 minutes of aggregated I/O wait time across all 24 time slices during the collection of the activity data for the object and 75 minutes of I/O wait time may occur between the hours of 2-3 p.m. whereby, for the "ith" time period from 2-3 p.m., p(i) may be the ratio of 75/100); and "log (p (i)) represents the logarithm (log) of the value p(i) to some base "b". (In one embodiment, "b" may be 2. In some embodiments, "b" may be the number of time slices such as 24 for a daily time pattern, 7 for a weekly time pattern, and the like. It should be noted that the particular value selected for the base "b" may be selected to vary the range of possible values that can be generated for entropy using EQUATION 4. For example, selecting "b" as the number of time slices or time periods in the time pattern results in calculating an entropy value for an object in the range of 0 to 1, inclusively.)

The entropy value such as may be calculated using EQUATION 4 is used to identify patterns. If the resulting entropy value calculated using EQUATION 4 is 1 for an object, it means that the activity for the object is spread evenly across all time slices (e.g., for daily time pattern, the I/O wait time is approximately the same throughout the 24 hour time period of the day). In contrast, if the entropy value determined using EQUATION 4 is 0 for the object, it means that the activity for the object occurs at one time slice (e.g., for daily pattern, the object's activity occurs within a single hour of the 24 hour time period of the day).

As a fourth step in connection with hint generation, values for the ranking metric of the objects as may be obtained using EQUATION 1 are ranked such as in terms of decreasing value. Thus, the objects may be ranked in terms of decreasing associated ranking metric values so that those objects having the highest such ranking metric values appear at the top or earlier in the list. In accordance with the techniques herein in a fifth step, a set of one or more objects are selected as those highest ranked objects having the highest values for the ranking metric of EQUATION 1.

With reference back to EQUATION 1, the objects having the highest ranking values are those having an entropy value at or closest to 0. Thus, generally, processing may select those objects having the entropy value at or closest to 0.

For this selected set of one or more objects, processing of a sixth step may be performed to identify time patterns of activity for each of the selected highest ranked objects. The time patterns may identify one or more times of significantly high and/or low activity for the object. In connection with this example being described, the time pattern selected is a daily pattern to identify one or more specific hours of the day that contain all or most of the activity for an object. In connection with determining whether a time period, such as particular hour of the day, for an object has a significantly high or significantly low activity level, the activity data such as total I/O wait time for each of the 24 hour time periods may be examined. The largest such total I/O wait time may be selected and the particular hour during which the largest total I/O wait time occurred may be noted. The largest total I/O wait time may then be compared to one or more thresholds to determine whether the largest total I/O wait time is significant such as greater than any one or more of the thresholds. For example, if the largest total I/O wait time (over all 24 hour time periods) is more than a first threshold representing a HIGH or HOT activity level, the hour of the day during which the largest total I/O wait time occurs may be deemed to have the HIGH or HOT activity level. If the largest total I/O wait time is not more than the first threshold hold but is greater than a second threshold (where the second threshold is less than the first threshold and the second threshold represents a MEDIUM or WARM activity level), the hour of the day during which the largest total I/O wait time occurs may be deemed to have the MEDIUM or WARM activity level. If the largest total I/O wait time is less than the second threshold, the hour of the day during which the largest total I/O wait time occurs may be deemed to have a LOW or COLD activity level.

In a seventh step, one or more hints may be generated for the selected objects based on the identified time patterns of significantly high and/or low activity. As described above, for one or more time periods of an object identified as having a particular activity level, a hint may be generated. Continuing with the example above, if an hour of the day such as from 2-3 p.m. for an object is identified as having a HIGH or HOT activity level, a hint may be accordingly generated and provided to the data storage optimizer for use in data storage movement optimization such as to promote the object to the highest possible storage tier from 2-3 p.m. during each day. Similarly, one or more hours of the day may be identified where the I/O wait time is the shortest and this may be identified as a time period of LOW or COLD activity and an embodiment may want to store the object in a lower performance tier (other the flash such as on FC or SATA) during this time period. The I/O wait time may be below a threshold value denoting a low threshold level of activity such as, for example, with respect to activity across all data portions or object evaluated. One or more hints may be generated based on the foregoing identified time period of high and/or low activity. A generated hint may identify, for example, when the data object is expected to be "HOT" (e.g., have a significantly high activity level such as above a particular threshold or amount) or COLD (e.g., have a significantly low activity level such as below a particular threshold or amount) and provide a time indication (e.g., time of day, day of week, etc.) regarding when this activity level is expected (e.g., "activity level=HOT or COLD" at "time period" such as from 1 p.m-3 p.m. each day, on Friday, or the $1^{st}$ and $3^{rd}$ day of each month, a particular month, and the like).

Although the above-mentioned example provides for identifying daily time activity patterns or particular times of each day, the techniques herein may be used in connection with identify activity levels based on other desired time patterns such as, for example, with respect to day of a week or day of the month and may accordingly generate hints for a particular day of the week or day of the month. For example, to identify time patterns with respect to day of the week, in processing described above, aggregate data based on each of the 7 days of the week and perform subsequent analysis steps using 7 days (e.g., 7 time periods of 1 day each rather than 24 hour time periods). In a similar manner, to identify time patterns with respect to day of the month, in processing above, aggregate data based on each day of the month (e.g., perhaps number 1 through N, N=max number of days in the month, and perform subsequent analysis steps using N days of month rather than 24 hours). Hints may be generated for the time period (e.g., hour of day, day of month, day of week or other level of granularity) to identify a particular time period (e.g., hours of days, days of week, days of the month, month(s) of the year, and the like), which are associated with a particular activity level such as high activity and/or low activity. An embodiment performing an analysis, for example, to identify weekly patterns (e.g., what day of the week includes all or most of the activity), may first identify one or more days including the most or least activity. A hint may be generated identifying a level of granularity of a day. Optionally, once one or more such days are identified, more detailed fine-grained time analysis may be performed to further determine further activity patterns such as on an hourly basis. For example, weekly patterns may indicate that Mondays have the largest total I/O wait time for an object. Data for Mondays may be further analyzed on an hourly basis to possibly identify any daily patterns within Mondays so that hint may be generated which provide hint information denoting an activity level, such as high, a day of the week=Monday, and additionally one or more hours on a Monday that may have the high activity level if such high level is not maintained throughout the day/24 hour period of Monday. In a similar manner, generally, a first level of time pattern analysis may be performed to identify a first time slice or time period based on this first level. Subsequently, a drill down approach may be optionally used to further refine and identify more detailed time patterns within the first time slice. This may be performed repeatedly for two or more levels as may be desired in an embodiment depending on the level of granularity desired for the time periods identified in the generated hint information.

Identified time periods of high activity identify possible promotion candidates for the highest/higher performance storage tiers. Identified time periods of low activity identify possible demotion candidates for the lowest/lower performance storage tiers. In an embodiment with three storage tiers, a medium or warm activity level may be identified as described above and result in an appropriate hint being generated. For the medium or warm activity level for the one or more identified time periods, the data storage optimizer may use this hint in connection with locating the object for the identified time periods in the mid-range or FC storage tier (where the embodiment includes the following 3 storage tiers—EFD (highest performance tier), FC (mid-range or second level performance tier) and SATA (lowest or third level performance storage tier)).

As described above generally the techniques may be used to identify different patterns using different time slices or time periods. In order to identify daily patterns, processing of the aggregated activity data may look for specific hours of day that contains all or most of the activity for an identified candidate object. In connection with processing described herein to identify daily patterns of activity, the I/O activity data may be aggregated based on the time or hour of day. The aggregated activity data for the hourly time periods may be used as inputs in connection with calculating a value of the selected metric such as in connection with EQUATION 1 and computing the entropy value as in connection with EQUATION 4. It should be noted that an embodiment may use EQUATION 1 to compute the ranking metric which is based on the entropy value and may also be used in ranking the objects. Alternatively, an embodiment may choose to simply calculate an entropy value for each object using EQUATION 4 and sort or rank the objects based on the entropy values obtained in EQUATION 4. If the entropy value as determined using EQUATION 4 for an object is 0, or approximately 0 (e.g., a number within a threshold of 0), it means that all or most of the I/O for the object is done at a specific time. If the entropy value is 1, or approximately 1 (e.g., a number within a threshold of 1 when using the particular base value as described herein), it means that the activity for the object is evenly spread across all hours of day, for example, with respect to a daily pattern.

In order to identify weekly patterns of activity, processing may be performed to identify activity on the day of the week that contains all or most of the activity. In this manner, the activity data for each object may be aggregated based on day of week. The aggregated activity data for 7 days of the week may be used as inputs in connection with calculating a value of the selected metric such as in connection with EQUATION 1 or alternatively EQUATION 4 as described. In a similar manner the above-mentioned processing may be performed for other time patterns such as to identify monthly, quarterly or yearly patterns of activity. For each such time pattern an appropriate time slice or time period may be used (e.g., daily=hourly time period, total 24 time periods, weekly=day of the week time period, total 7 time periods for 7 days of the week).

In connection with the techniques herein, examples are described to identify and provide hints for database objects or another database entity which may have more meaning to the user than just a data portion having a logical address of a device and device location or offset. Generally, the techniques herein may be used in connection with generating hints for other database entities, or more generally any data portion.

An embodiment may also use another metric than as described above. For example, standard deviation may be used rather than entropy as in EQUATION 4 in an embodiment in connection with techniques herein. An embodiment may perform processing including the first step to collect the activity data for data portions, such as objects, as described above. The processing may then include aggregating the activity data in the second step as described above based on suitable time slices or time periods for the desired pattern such as daily, weekly, and the like. In the third step, a value for the desired metric may be calculated. In this case, the metric may be for computing standard deviation, a, for each object or other data portion based on the aggregated activity information. The standard deviation may be determined as represented in EQUATION 5 below:

$$\sigma(x) = \sqrt{\frac{\sum_{i=1}^{N}(x-\bar{x})^2}{N-1}} \quad \text{EQUATION 5}$$

where "i" and "N" are as described above for the N time periods or time slices for which aggregated data is obtained for an object, each of the N occurrence of x represent an instance of activity data for one of the time periods, $\bar{x}$ is the arithmetic mean of all aggregated activity values, x, for the N time slices or time periods for the object, and $\Sigma$ is the summation function summing the difference between each value of x and the mean $\bar{x}$. In statistics, standard deviation such as represented in EQUATION 5 may be characterized as a metric denoting an amount of variation or dispersion exists from the average (e,g, mean or expected value) of the activity data. A low standard deviation indicates that the activity data for N the time periods tend to be very close to the mean (e.g., not much dispersion or variation from the mean). In contrast, a the higher the standard deviation, the more spread out or dispersion there is of the activity data for the timer periods over a large range of values. After computing the standard deviation in the third step for each object or other data portions, the fourth step of ranking the objects based on the metric values may be performed. For example, the standard deviation values for the objects may be sorted from highest to lowest to identify a ranking of the objects, accordingly, from highest to lowest. A set of one or more objects having the highest standard deviation values may be selected as candidates for hint generation. The aggregated data for each of the selected object candidates may be further examined to identify one or more times of the day that activity for the object increases significantly above a particular threshold level or decreases significantly, such as below a particular threshold level as described above. In a similar manner as also described above, activity patterns of high, low or other activity levels may be identified for different time periods or time slices (e.g., for weekly, monthly or other desired time patterns having different levels of granularity for hint generation). Hints may be generated for identified time periods for the selected candidate objects as described above.

In connection with the fourth step of ranking the objects based on the standard deviation metric, an embodiment may use the ranking metric of the objects as may be obtained using EQUATION 1 in a manner similar to that as described above in connection with using entropy as the metric (e.g., as may be determined using EQUATION 4). In other words, an embodiment may using the standard deviation metric of EQUATION 5 rather than entropy as in EQUATION 4. The embodiment may then use a modified version of EQUATION 1 as follows in EQUATION 1A with standard deviation values rather than entropy:

$$\text{ranking} = (\text{intensity})^{1-\text{standard deviation}} \quad \text{EQUATION 1A}$$

The ranking values of EQUATION 1A may then be ranked such as in terms of decreasing value. Thus, the objects may be ranked in terms of decreasing associated ranking metric values so that those objects having the highest such ranking metric values appear at the top or earlier in the list. In accordance with the techniques herein in a fifth step, a set of one or more objects are selected as those highest ranked objects having the highest values for the ranking metric of EQUATION 1A with the standard deviation metric. More generally, EQUATION 1 and 1A may be modified for use with other suitable metrics besides entropy and standard deviation as described herein.

In connection with the standard deviation metric, the activity data may be the total I/O wait time as described above. Alternatively, an embodiment may use one or more other measurements of I/O activity for which the metric of standard deviation is determined. For example, an embodiment may generally use any suitable measurement of workload or activity such as I/O throughput (e.g., number of I/O operations per second) or average response time. Generally, other metrics described herein (e.g., entropy of EQUATION 4) may be used in connection with any suitable measurement of I/O activity (e.g., total I/O wait time, average response time, and the like).

As another example of a metric that may be used in a manner similar to entropy (e.g., EQUATION 4) and standard deviation (e.g., EQUATION 5), the maximum value of p(i) (MAX p(i)) for an object that occurs during time slice "i" may also be determined for use as:

$$\text{MAX}(p(i)) \text{ for an object} = \text{largest } (p(i)) \text{ across all } N \text{ time slices} \quad \text{EQUATION 6}$$

For example, let the total aggregated I/O wait time for an object observed be 100 seconds. Assume a 24 hour time pattern thereby having 24 time slices. It may be that 99 of the 100 seconds of total aggregated I/O wait time occur from 2-3 p.m. and 1 second of the 100 seconds of total aggregated I/O wait time occur from 4-5 p.m. In this case, the value of p(i) for the time period 2-3 p.m. is $99/100$ or 99%, and the value of p(i) for the time period 4-5 p.m. is $1/100$ or 1% thereby having MAX (p(i)) be 99%. The metric value MAX (p(i)) for the object determined using EQUATION 5 may then be substituted in EQUATION 1 replacing the entropy metric or EQUATION 1A replacing the standard deviation metric. The foregoing may be represented as follows:

$$\text{ranking} = (\text{intensity})^{1-\text{MAX}(p(i))} \quad \text{EQUATION 1B}$$

In this manner, the ranking values determined using EQUATION 1B with the MAX (p(i)) metric may be used to rank the objects and select the highest ranked objects for which hints may be generated.

Figure 6:
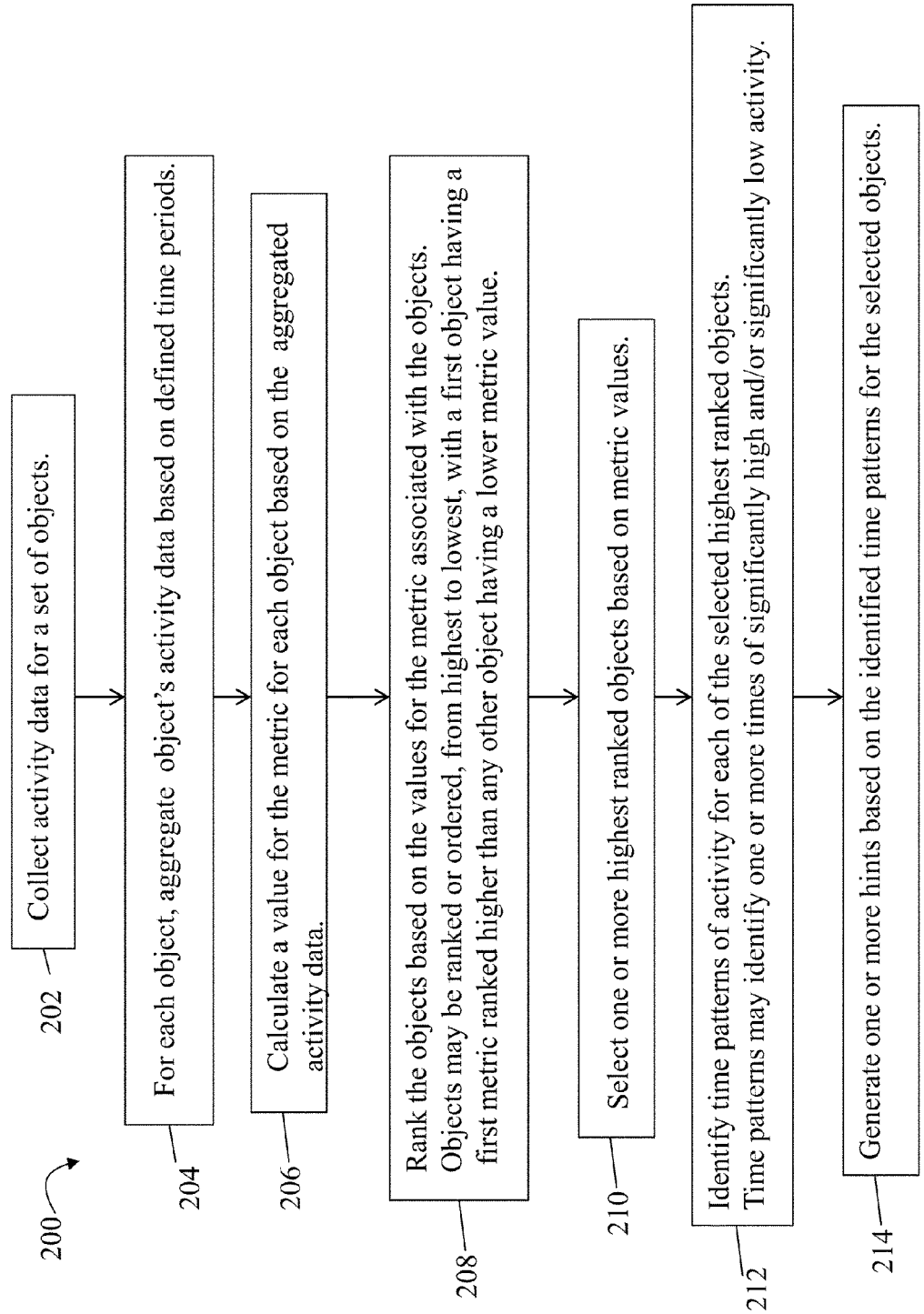
FIG. 6 is a flowchart of processing steps that may be performed in an embodiment in accordance with techniques herein.

Referring to FIG. 6, shown is a flowchart summarizing processing as described above. The flowchart 200 describes processing as may be performed with respect to objects as the data portions. However, as described herein, the processing steps may be generalized in connection with other data portions besides objects. At step 202, the activity data is collected for a set of objects. The activity data for objects or other data portions may be obtained using any suitable means such as a software tool like DBClassify™ as described herein. At step 204, for each object, the object's activity data is aggregated based on defined time periods or time slices (e.g. hours of the day, days of the week, and the like, depending on the desired time pattern analysis being performed). At step 206, a value for the selected metric is calculated for each object based on the object's aggregated activity data. As described herein, the metric may be the ranking metric of EQUATION 1 1A or 1B, entropy as in EQUATION 4, standard deviation as in EQUATION 5, or MAX (p(i)) as in EQUATION 6. At step 208, the objects are ranked based on the values for the metric associated with the objects. Objects may be ranked or ordered from highest to lowest based on the particular metric and metric values calculated for the objects. Based on the object ranking in step 208, one or more of the highest ranked objects are selected in step 210. At step 212, time patterns of activity are identified for each of the highest ranked objects selected in step 210. The time patterns identified in step 212 may identify one or more time of significantly high and/or significantly low activity levels. Such significance of activity may be based on one or more thresholds, relative activity of other data portions, and the like. It should be noted that entropy as described herein (e.g., EQUATION 4 values) may be used herein to facilitate identification of time patterns of significantly high and/or low activity. For example, entropy values at or close to zero may represent time slices or time periods of significantly high wait time thereby indicating a high activity time period. At step 214, one or more hints may be generated based on the identified time periods and patterns for the selected objects. As described above, the generated hints may be provided to the data storage optimizer for use in performing data storage movement optimizations such as to identify data portions which are candidates for promotion to the highest/higher performing tiers and/or demotion to the lower/lowest performing tiers and different time periods based on recurrent patterns identified using techniques herein.

Referring to FIG. 7, shown is an example of information that may be included in a hint generated in accordance with techniques herein. The example 400 illustrates information that may be included in a hint generated in connection with step 214 of FIG. 6. A hint may include location information 402, may identify one or more time periods or time slices 404, and may identify an activity level 406 for the time periods of 404. The location 402 may identify a location in terms of a device and offset for the data portion for which the hint is generated. In the case where hints are generated for objects, the location 402 may identify a device and offset location of the object such as a logical device location. The data portion of the logical device location may then be moved as needed between physical devices of different storage tiers in connection with data storage movement optimization processing (e.g. to promote the data portion to higher/highest storage tiers during periods of high activity or workload, and to demote the data portion to lower/lowest storage tiers during periods of low activity or workload). The time period 404 may identify, for example, one or more hours of the day, day of the week, and the like, for which the hint is generated. The activity level 406 may denote an activity level such as LOW, HIGH, MEDIUM as described above associated with the identified time periods of 404. Rather than include a category or classification of activity level such as LOW, MEDIUM or HIGH, an embodiment may include an expected level of workload or activity associated with the time periods as may be determined based on historically collected data. Such hint information may be used, alone or possibly in combination with other information, by the data storage optimizer to perform data storage movement optimizations and evaluations related to such optimizations.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for providing hints comprising:
receiving input/output (I/O) wait time activity data for a plurality of data portions, said I/O wait time activity data for each of the plurality of data portions denoting an amount of time waiting for I/O operations, directed to said each data portion, to complete;
performing first processing for each of the plurality of data portions, said first processing including:
aggregating I/O wait time activity data for said each data portion for each of a plurality of time periods; and
determining a value for a metric for said each data portion in accordance with criteria including the I/O wait time activity data from said aggregating for said each data portion and an entropy value determined with respect to the I/O wait time activity data for said each data portion, wherein said entropy value for said each data portion is included in a range having a minimum and a maximum, wherein said entropy value of said metric for said each data portion provides an indication regarding how evenly I/O wait time for said each data portion is spread across said plurality of time periods, and denotes a variation in I/O wait time of said each data portion with respect to I/O wait time of said each data portion in said plurality of time periods, wherein if said each data portion has a same I/O wait time in each of the plurality of time periods, said entropy value of said metric for said each data portion is the maximum of the range indicating no variation in I/O wait for said each data portion, and if said each data portion has all its I/O wait time occur in a single one of the plurality of time periods, said entropy value of said metric for said each data portion is the minimum of the range indicating a largest possible variation in I/O wait time for said each data portion;
ranking a plurality of values for the metric determined by said first processing for said plurality of data portions;
identifying, based on said ranking, a set of one or more of said plurality of data portions, wherein each data portion in said set is ranked higher by said ranking as having a greater variation in I/O wait time over the plurality of time periods than any other data portion of said plurality of data portions not included in said set; and
performing hint generation processing to generate a hint for each data portion in said set, said hint being used in connection with performing data storage movement optimizations to move selected ones of said plurality of data portions between different storage tiers having different performance classifications, wherein said hint for said each data portion in said set includes a location of said each data portion, identifies one or more of the plurality of time periods, and identifies a level of activity for said each data portion during the identified one or more time periods of the hint based on said I/O wait time activity data, and wherein, when said level of activity of said each data portion denotes a level of activity above a threshold, the hint for said each data portion is used in connection with evaluating whether to promote said each data portion in connection with the data storage movement optimization thereby moving said each data portion from a first storage tier to a second storage tier, where the second storage tier has a performance classification higher than the first storage tier.

2. The method of claim 1, wherein said identifying further comprises:
selecting one of the plurality of data portions having a first value for the metric that is a largest of the plurality of values; and
performing hint generation processing for said one data portion.

3. The method of claim 1, wherein when said level of activity of said each data portion denotes a level of activity below a threshold, the hint for said each data portion is used in connection with evaluating whether to demote said each data portion in connection with the data storage movement optimization thereby moving said each data portion from one storage tier to another storage tier, where the one storage tier has a performance classification higher than the another storage tier.

4. The method of claim 1, wherein said criteria includes a size denoting an amount of storage, and a weighted I/O activity value determined using the I/O wait time activity data for said each data portion, said weighted I/O activity value denoting a measure of how active said each data portion is.

5. The method of claim 4, wherein a set of one or more applications issue I/Os to said each data portion, wherein said size denotes a size of said each data portion, and wherein said weighted I/O activity value for said each data portion is determined in accordance with, for each of said one or more applications of the set, a priority of said each application and I/O activity from said each application that is directed to said each data portion, said priority denoting an importance of said each application accessing said each data portion during a particular time period when data indicating the I/O activity from said each application is collected.

6. The method of claim 4, wherein the weighted I/O activity value is determined in accordance with a first I/O activity associated with sequential read operations, a second I/O activity associated with random read operations, and a constant denoting an increase in performance gained if a data portion of random read data is promoted to a particular storage tier rather than promoting a data portion of sequentially read data to the particular storage tier.

7. The method of claim 1, wherein said plurality of time periods correspond to hours of a day.

8. The method of claim 1, wherein said plurality of time periods correspond to days of any of a week or a month.

9. The method of claim 1, wherein said plurality of time periods correspond to months of a year.

10. The method of claim 1, wherein said plurality of data portions are objects of a database.

11. The method of claim 10, wherein said method further includes determining a plurality of ranking values for said plurality of data portions, each of said plurality of ranking values for a corresponding one of the plurality of data portions represented as:
$$intensity^{(1-entropy)}$$
wherein intensity is a value denoting a level of activity for said corresponding one of the plurality of data portions and entropy represents the entropy value for said corresponding one of the plurality of data portions.

12. The method of claim 11, wherein each data portion in said set has one of the plurality of ranking values which is larger than all others of said plurality of ranking values associated with data portions of the plurality not included in the set.

13. The method of claim 11, wherein said entropy value is a value that is equal to or greater than zero (0) and wherein if said entropy value is 0 for said each data portion, then activity for said each data portion occurs in a single one of the plurality of time periods.

14. The method of claim 13, wherein said intensity is determined based on an intensity calculation which varies with size of said each data portion and gives greater weight to I/O wait time associated with random read operations than I/O wait time associated with sequential read operations.

15. A non-transitory computer readable medium comprising code stored thereon for providing hints, the non-transitory computer readable medium comprising code stored thereon that, when executed by a processor, performs a method for providing hints comprising:
receiving I/O wait time activity data for a plurality of data portions, said I/O wait time activity data for each of the plurality of data portions denoting an amount of time waiting for I/O operations, directed to said each data portion, to complete;
performing first processing for each of the plurality of data portions, said first processing including:
aggregating I/O wait time activity data for said each data portion for each of a plurality of time periods; and
determining a value for a metric for said each data portion in accordance with criteria including the I/O wait time activity data from said aggregating for said each data portion and an entropy value determined with respect to the I/O wait time activity data for said each data portion, wherein said entropy value for said each data portion is included in a range having a minimum and a maximum, wherein said entropy value of said metric for said each data portion provides an indication regarding how evenly I/O wait time for said each data portion is spread across said plurality of time periods, and denotes a variation in I/O wait time of said each data portion with respect to I/O wait time of said each data portion in said plurality of time periods, wherein if said each data portion has a same I/O wait time in each of the plurality of time periods, said entropy value of said metric for said each data portion is the maximum of the range indicating no variation in I/O wait for said each data portion, and if said each data portion has all its I/O wait time occur in a single one of the plurality of time periods, said entropy value of said metric for said each data portion is the minimum of the range indicating a largest possible variation in I/O wait time for said each data portion;
ranking a plurality of values for the metric determined by said first processing for said plurality of data portions;

identifying, based on said ranking, a set of one or more of said plurality of data portions, wherein each data portion in said set is ranked higher by said ranking as having a greater variation in I/O wait time over the plurality of time periods than any other data portion of said plurality of data portions not included in said set; and performing hint generation processing to generate a hint for each data portion in said set, said hint being used in connection with performing data storage movement optimizations to move selected ones of said plurality of data portions between different storage tiers having different performance classification, wherein said hint for said each data portion in said set includes a location of said each data portion, identifies one or more of the plurality of time periods, and identifies a level of activity for said each data portion during the identified one or more time periods of the hint based on said I/O wait time activity data, and wherein, when said level of activity of said each data portion denotes a level of activity above a threshold, the hint for said each data portion is used in connection with evaluating whether to promote said each data portion in connection with the data storage movement optimization thereby moving said each data portion from a first storage tier to a second storage tier, where the second storage tier has a performance classification higher than the first storage tier.

16. A system comprising:
one or more data storage systems for which data storage movement optimizations are performed by a data storage optimizer; and
a non-transitory computer readable medium comprising code stored thereon that, when executed by a processor, performs a method for providing hints comprising:
receiving I/O wait time activity data for a plurality of data portions, said I/O wait time activity data for each of the plurality of data portions denoting an amount of time waiting for I/O operations, directed to said each data portion, to complete;
performing first processing for each of the plurality of data portions, said first processing including:
aggregating I/O wait time activity data for said each data portion for each of a plurality of time periods; and
determining a value for a metric for said each data portion in accordance with criteria including the I/O wait time activity data from said aggregating for said each data portion and an entropy value determined with respect to the I/O wait time activity data for said each data portion, wherein said entropy value for said each data portion is included in a range having a minimum and a maximum, wherein said entropy value of said metric for said each data portion provides an indication regarding how evenly I/O wait time for said each data portion is spread across said plurality of time periods, and denotes a variation in I/O wait time of said each data portion with respect to I/O wait time of said each data portion in said plurality of time periods, wherein if said each data portion has a same I/O wait time in each of the plurality of time periods, said entropy value of said metric for said each data portion is the maximum of the range indicating no variation in I/O wait for said each data portion, and if said each data portion has all its I/O wait time occur in a single one of the plurality of time periods, said entropy value of said metric for said each data portion is the minimum of the range indicating a largest possible variation in I/O wait time for said each data portion;

ranking a plurality of values for the metric determined by said first processing for said plurality of data portions;

identifying, based on said ranking, a set of one or more of said plurality of data portions, wherein each data portion in said set is ranked higher by said ranking as having a greater variation in I/O wait time over the plurality of time periods than any other data portion of said plurality of data portions not included in said set; and performing hint generation processing to generate a hint for each data portion in said set, said hint being used in connection with performing data storage movement optimizations to move selected ones of said plurality of data portions between different storage tiers having different performance classifications, wherein said hint for said each data portion in said set includes a location of said each data portion, identifies one or more of the plurality of time periods, and identifies a level of activity for said each data portion during the identified one or more time periods of the hint based on said I/O wait time activity data, and wherein, when said level of activity of said each data portion denotes a level of activity above a threshold, the hint for said each data portion is used in connection with evaluating whether to promote said each data portion in connection with the data storage movement optimization thereby moving said each data portion from a first storage tier to a second storage tier, where the second storage tier has a performance classification higher than the first storage tier.

17. The system of claim 16, wherein said different storage tiers include at least one storage tier of solid state storage drives and another storage tier of rotating disk drives.

* * * * *